United States Patent [19]

Rappold

[11] Patent Number: 4,824,138

[45] Date of Patent: Apr. 25, 1989

[54] ROCKER ARM STABILIZER BAR ASSEMBLY

[76] Inventor: Darwin Rappold, 3920 El Canto Dr., Spring Valley, Calif. 92077

[21] Appl. No.: 152,949

[22] Filed: Feb. 8, 1988

[51] Int. Cl.⁴ ............................................. B60G 11/10
[52] U.S. Cl. .................................................. 280/682
[58] Field of Search ...................... 280/682, 676, 683; 282/682

[56] References Cited

U.S. PATENT DOCUMENTS

| | | | |
|---|---|---|---|
| 2,639,166 | 5/1953 | Jones | 280/682 |
| 2,957,058 | 10/1960 | Trott | 280/682 |
| 3,392,988 | 7/1968 | Marinelli | 280/682 |
| 3,608,923 | 9/1971 | Houfek, Sr. | 280/682 |
| 3,614,122 | 10/1971 | Herrer | 280/682 |
| 4,033,606 | 7/1977 | Ward et al. | 280/682 |

*Primary Examiner*—Richard A. Bertsch
*Attorney, Agent, or Firm*—Charles C. Logan, II

[57] ABSTRACT

A rocker arm stabilizer bar assembly that is designed for use with a tandem axle travel trailer and it is used when one of the four tires of the trailer goes flat. It is used temporarily in place of a spare tire until the driver can get to the nearest service station to repair the flat tire. The stabilizer bar assembly is clamped into position between the bottom surface of the trailer frame and the top surface of the rocker arm. The stabilizer bar is channel-shaped and it is vertically oriented. A bolt passes through a horizontal aperture in the stabilizer bar and a horizontal aperture in a spanner plate and it has a nut threaded on its end to clamp it into position adjacent the respective ends of a U-shaped bracket that supports the rocker arm. The stabilizer bar has a pair of intermediate horizontal walls having tongue portions that function to center the stabilizer bar within the walls of the U-shaped bracket that supports the rocker arm.

5 Claims, 1 Drawing Sheet

ROCKER ARM STABILIZER BAR ASSEMBLY

BACKGROUND OF THE INVENTION

The invention relates to a stabilizer bar assembly and more specifically to one that is used between the frame and rocker arm of a tandem axle travel trailer.

In the past one of the problems involved in towing a travel trailer having a tandem axle is the fact that when one of the tires goes flat it is imperative that the flat tire be removed and either fixed or replaced with a spare tire before travel can continue. The reason for this is the fact that with tandem axle trailers, a rocker arm supported from the bottom surface of the trailer frame is utilized to support one end of the leaf springs of the respective front wheel and rear wheel. When both tires are fully inflated, the rocker arm is maintained with its bottom surface in a horizontal orientation. If one of the tires develops a flat, the rocker arm pivots about its support axis with the end which supports the leaf spring of the tire which is still operational being pushed upwardly while the leaf spring that supports the flat tire dropping to a lower position. Continued travel in this state will damage the flat tire to the extent that it cannot be fixed. As a result, it is necessary that the driver of the trailer have a spare tire and that the flat tire be changed before continued travel.

The need for a spare tire requires the expense for the tire and also some means of support for storing the tire. It also adds additional weight to the load of the trailer.

It is an object of the invention to provide a novel rocker arm stabilizer bar assembly that can eliminate the cost of having a spare tire while traveling.

It is also an object of the invention to provide a novel rocker arm stabilizer bar assembly that eliminates the need for storage space for a bracket for mounting a spare tire.

It is another object of the invention to provide a novel rocker arm stabilizer bar assembly that can be easily installed and removed when one of the tires of a tandem axle travel trailer becomes deflated.

It is a further object of the invention to provide a novel rocker arm stabilizer bar assembly that is economical to manufacture and market.

SUMMARY OF THE INVENTION

Applicant's novel rocker arm stabilizer bar assembly is designed for use with tandem axle travel trailers. On this type of travel trailer the rear end of the leaf spring of the front wheel and the front end of the leaf spring of the rear wheel are supportedly connected to opposite ends of a rocker arm supported from the bottom surface of the trailer frame. When both the front and rear wheels are properly inflated the bottom surface of the rocker arm is generally horizontal. When one of the wheels develops a flat tire, the end of the leaf spring of that wheel pushes its end of the rocker arm downwardly with the result that the other end of the rocker arm is pushed upwardly and its one end of the other leaf spring is pushed upwardly also. Continued travel with a flat tire can result in total destruction to the tire. Therefore it is necessary to stop and change the flat tire or fix it at that point. If the driver of the trailer has a spare tire, which is normal, he puts the spare tire on in place of the flat tire.

With applicant's rocker arm stabilizer bar assembly, it is not necessary to have a spare tire although the flat tire would be removed from its axle. The rocker arm stabilizer bar assembly is inserted into the gap between the bottom surface of the trailer frame and the top surface of the rocker arm. It is attached in position by a bolt passing through the stabilizer bar and the open space of the inverted U-shaped bracket that supports the rocker arm. A spanner plate applied to the opposite side of the U-shaped bracket has the bolt pass through it and once the nut is threaded tightly thereon the rocker arm stabilizer bar assembly is secured in place. Since the stabilizer bar assembly fills the gap between the bottom surface of the trailer frame and the normal position of the top surface of the rocker arm, the rocker arm cannot pivot upwardly in its normal fashion when there is a flat tire. With the rocker arm stabilizer bar assembly in position the driver of the vehicle can continue traveling, but at a reduced speed, to a tire repair service station.

To install the rocker arm stabilizer bar assembly, it is necessary that the end of the rocker arm having the flat tire be pivoted upwardly a sufficient height so that the rocker arm stabilizer bar assembly can be inserted against the top surface of the other end of the rocker arm. One way of accomplishing this is to pull the wheel with the flat tire onto a block approximately five inches high which will raise that end of the rocker arm up a sufficient distance to allow the rocker arm stabilizer assembly to be inserted at the other side of the rocker arm. Once the stabilizer bar assembly has been installed, the driver can back off of the block. The flat tire can be removed and the driver may proceed to the nearest repair station. In most cases using this method, it is not necessary to use a jack.

DESCRIPTION OF THE PREFERRED EMBODIMENT

Figure 1:
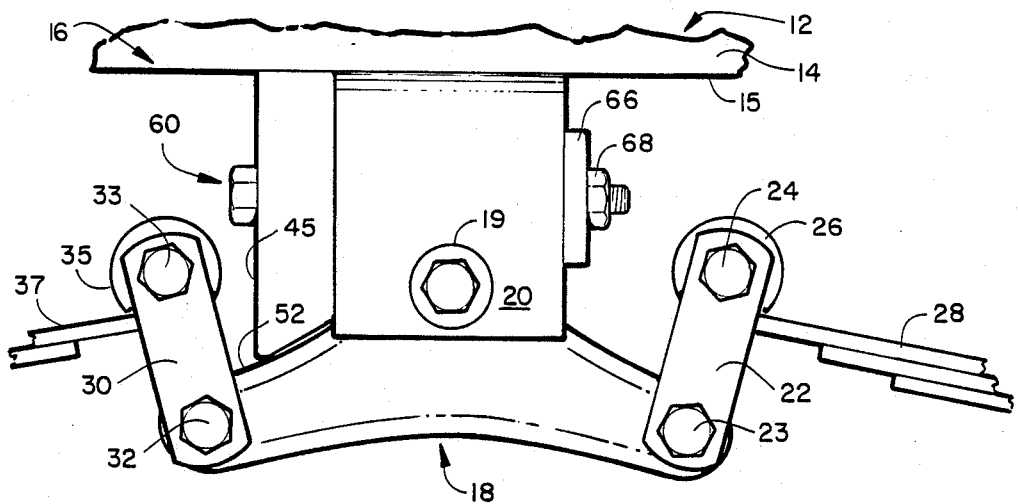
FIG. 1 is a side elevation view of applicant's novel rocker arm stabilizer bar assembly installed in position between the top of the rocker arm and the bottom surface of the trailer frame.

Applicant's novel rocker arm stabilizer bar assembly will now be described by referring to FIGS. 1-3 of the drawing. The stabilizer bar assembly is generally designated numeral 10. It is utilized in conjunction with a tandem axle trailer 12 having a trailer frame 14. An inverted U-shaped bracket 16 is welded to the bottom surface 15 of the trailer frame.

A channel-shaped rocker arm 18 is supported on a pivot pin 19 passing through the laterally spaced legs 20 of inverted U-shaped bracket 16. A lever arm 22 has its bottom end pivoted about pivot pin 23 and its top end pivoted about pivot pin 24. Pivot pin 24 is captured within the curled tip 26 of the front wheel leaf spring 28. Lever arm 30 has its bottom end pivoted about pivot pin 32 and its top end pivoted pivot pin 33. Pivot pin 33 is captured within the curled tip 35 of rear wheel leaf spring 37. When both the front and rear tires are fully inflated, the bottom surface of the rocker arm 18 is generally horizontal. When one of the tires becomes flat or underinflated it causes the rocker arm 18 to dip in that direction with the opposite end of the rocker arm being raised upwardly.

Figure 2:
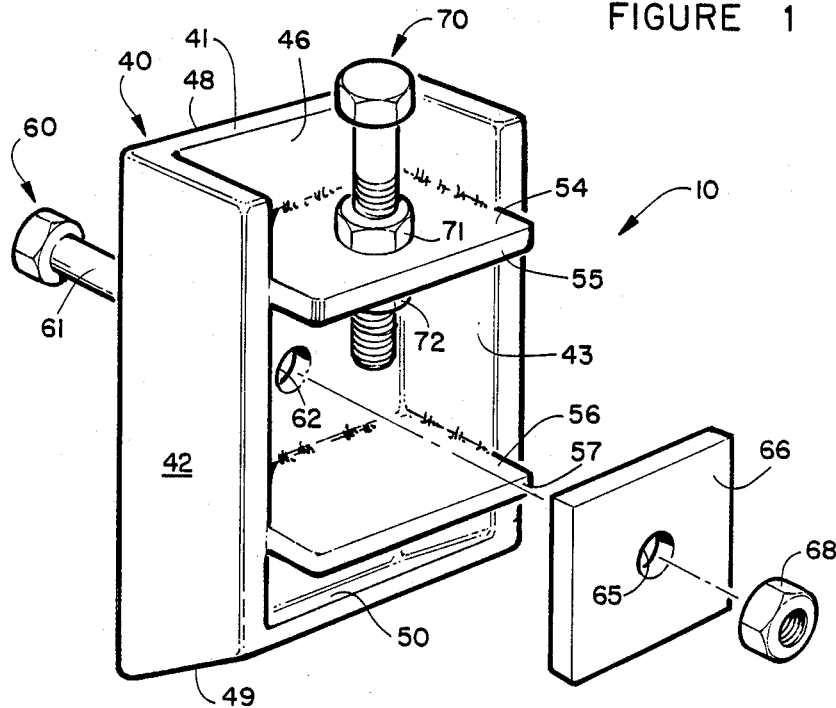
FIG. 2 is an exploded perspective view of the novel rocker arm stabilizer assembly.

The rocker arm stabilizer bar assembly 10 is best described by referring to FIG. 2. It is formed from a channel-shaped stabilizer bar 40 having a rear wall 41, and side walls 42 and 43. Rear wall 41 has a front surface 46 and a rear surface 45. It also has a top end 48 and a bottom end 49. Bottom wall 50 slopes upwardly at an angle that mates with the sloping top wall 52 of rocker arm 18. Intermediate horizontal walls 54 and 56 have respective tongue portions 55 and 57.

A bolt 60 having a shank portion 61 passes through a horizontal aperture 62 in rear wall 41. The threaded end of shank portion 61 passes through an aperture 65 in spanner plate 66 and has a nut 68 threaded thereon.

A height adjusting bolt 70 passes through an aperture (not shown) in intermediate horizontal wall 54. Nuts 71 and 72 are threaded on bolt 70 in order to secure the bolt at its proper height.

Figure 3:
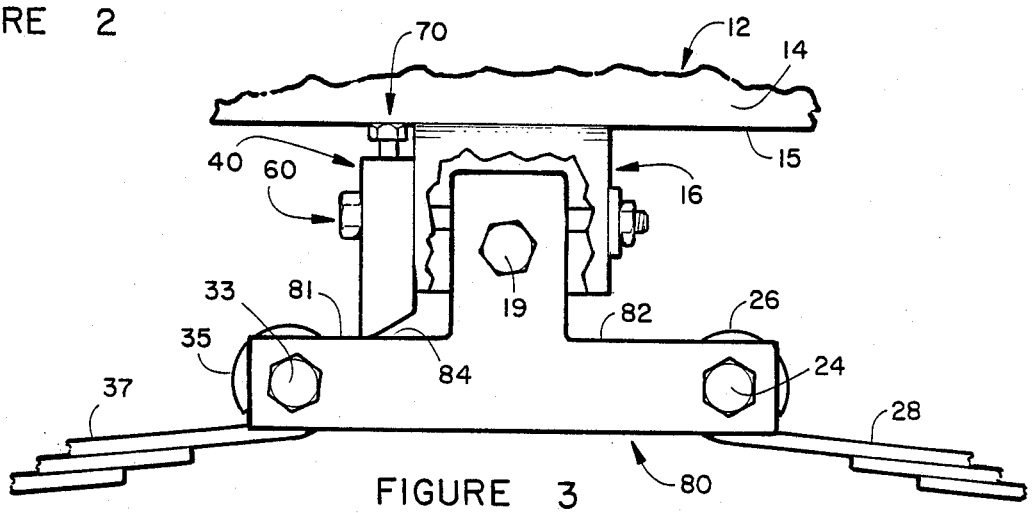
FIG. 3 is a side elevation view illustrating the rocker arm stabilizer bar assembly in use in conjunction with a rocker arm having a different top surface configuration.

In FIG. 3 a channel-shaped rocker arm 80 is illustrated and it has horizontally oriented top walls 81 and 82. For this embodiment the bottom wall 84 of the stabilizer bar could be horizontal to mate with the horizontal top walls of the rocker arm. The remaining structure of the rocker arm stabilizer bar assembly would be identical to that illustrated in FIG. 2.

What is claimed is:

1. A rocker arm stabilizer bar assembly for a tandem axle trailer comprising:

a vertically oriented elongated stabilizer bar for installation between the bottom surface of a tandem axle trailer frame and the top surface of a rocker arm that has its repsective forward and rearward ends connected to one end of the front wheel leaf spring and one end to the rear wheel leaf spring of the trailer, said stabilizer bar having a top end, a bottom end, a front surface and a rear surface;

an aperture in said stabilizer bar intermediate its top and bottom ends, said aperture passing through said stabilizer bar from its front surface to its rear surface; and a primary bolt having a shank portion that is threaded adjacent its one end, a spanner plate having an aperture passing therethrough, the shank of said primary bolt passing through the aperture of said stabilizer bar and the aperture in said spanner plate and a nut is threaded on the end of said primary bolt whereby said stabilizer bar may be clamped in position against one end of a bracket that supports the rocker arm and the spanner plate can be clamped against the opposite end of the bracket.

2. A rocker arm stabilizer bar assembly as recited in claim 1 wherein said stabilizer bar is channel shaped and formed from a vertically oriented front wall and laterally spaced side walls.

3. A rocker arm stabilizer bar assembly as recited in claim 2 further comprising a bottom wall sloped upwardly from front to rear to mate with the sloped top wall surface of a rocker arm.

4. A rocker arm stabilizer bar assembly as recited in claim 1 further comprising means for adjusting the height of the rocker arm stabilizer bar assembly.

5. A rocker arm stabilizer bar assembly as recited in claim 1 further comprising means for centering the stabilizer bar against the bracket that supports the rocker arm.

* * * * *